Oct. 23, 1951 R. JANES 2,572,346
ABSTRACTING HOT GAS FROM THE EXHAUSTS
OF GAS-TURBINE ENGINES
Filed May 19, 1949 2 SHEETS—SHEET 1
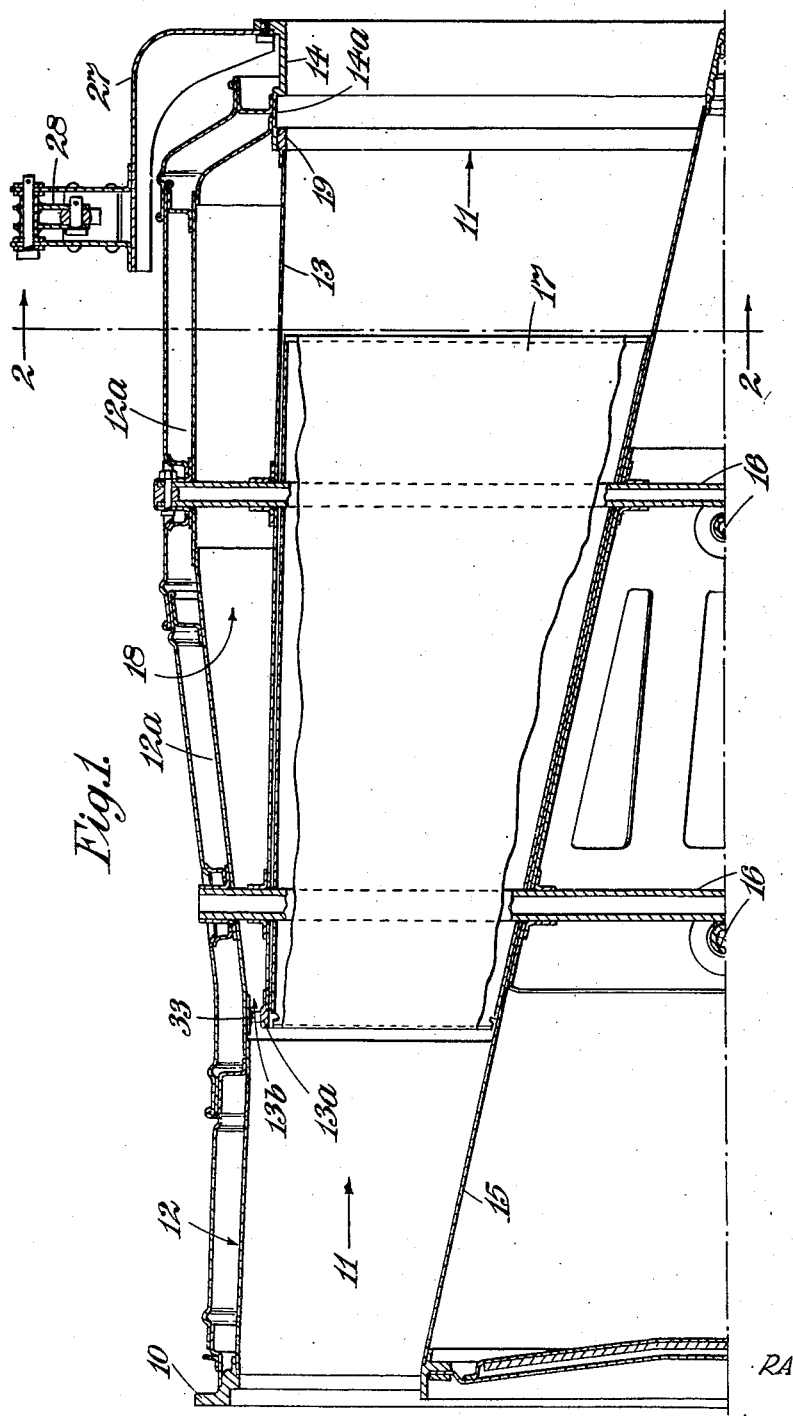
INVENTOR
RALPH JANES
by Wilkinson Mawhinney
Attys

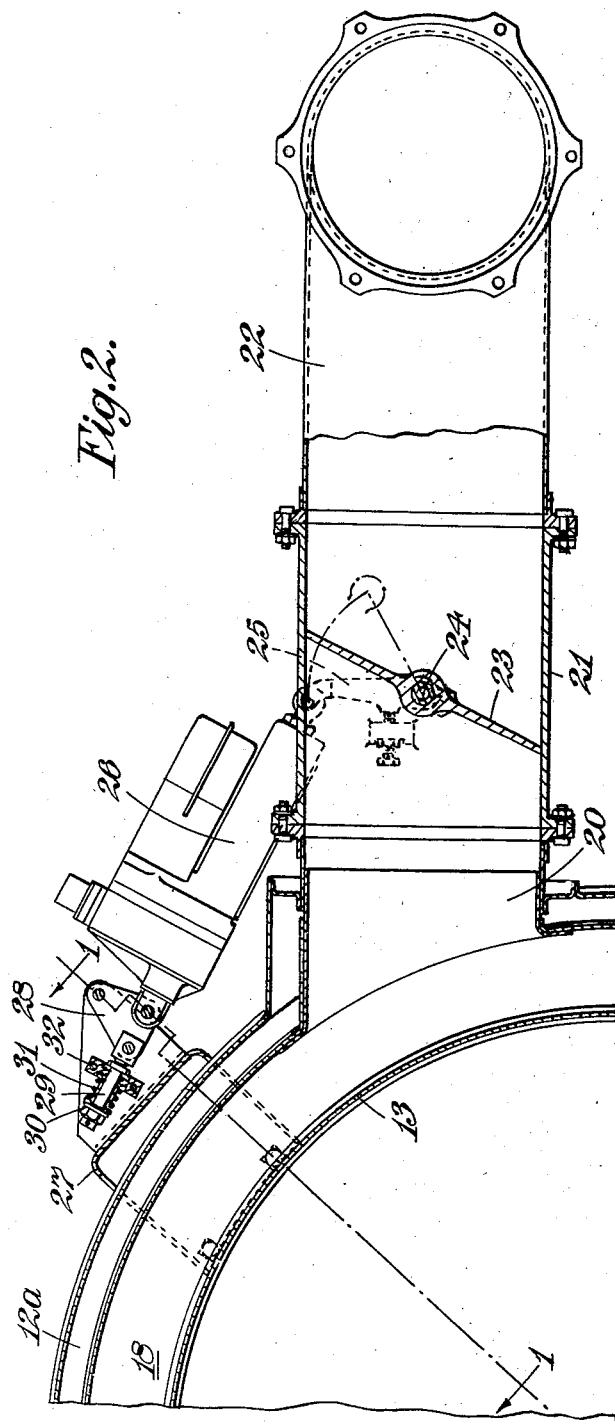

Patented Oct. 23, 1951

2,572,346

UNITED STATES PATENT OFFICE 2,572,346

ABSTRACTING HOT GAS FROM THE EXHAUSTS OF GAS-TURBINE ENGINES

Ralph Janes, Duffield, England, assignor to Rolls-Royce Limited, Derby, England, a British company Application May 19, 1949, Serial No. 94,192
In Great Britain May 25, 1948

7 Claims. (Cl. 60—39.5)

This invention relates to gas-turbine engines.

An important application of the invention is to gas-turbine engines such as are used in aircraft for propulsion purposes.

A gas-turbine engine normally includes a compressor system compressing air and delivering it to combustion equipment, the combustion products wherefrom pass to a turbine to drive it.

In the installation of gas-turbine engines in aircraft, in particular, it is desirable to provide "anti-icing" means, that is to make provision against the build-up of ice in the air-intake and on compressor parts under atmospheric conditions favourable to ice formation, or to remove any ice so formed.

It has been proposed for anti-icing purposes to tap off hot gases upstream or downstream of the turbine and to inject the tapped-off hot gas into the air at the compressor inlet to heat it. If the hot-gas tapping is effected upstream of the turbine undesirable energy losses occur in that the tapped-off hot gas does no work on the turbine; when the tapping is made downstream of the turbine through a simple tapping orifice in the exhaust duct wall, insufficient gas pressure is available to cause the desired hot-gas flow under certain engine running and flight conditions.

The primary object of the present invention is to provide means for effecting a hot-gas tapping on the downstream side of the turbine which enables an adequate flow of exhaust gas under sufficient pressure to be obtained, without introducing an excessive obstruction to the flow of the exhaust-gas through the turbine exhaust duct. It will be appreciated that the presence of obstruction in the exhaust duct may cause undesirable losses particularly where the engine is used for the purpose of aircraft jet propulsion. It is a further object of the invention, to provide hot-gas tapping means having a small number of moving or controlled parts.

According to the present invention, there is provided a turbine exhaust arrangement for a gas-turbine engine having means for extracting exhaust gas from the exhaust stream comprising in combination a portion of an exhaust duct defining wall which closely follows the desired form of the duct but has its leading edge, i. e. the edge nearer the turbine, spaced into the duct away from the adjacent part of the duct defining wall so as to constitute a high velocity gas entry gap which faces upstream of the duct; a collector chamber having an inlet formed by said gap and an outlet, and characterised in that the cross-sectional area of the chamber increases gradually from its inlet to its outlet whereby diffusion of the exhaust gas occurs to convert velocity energy to pressure energy; and distribution ducting connecting the outlet of said chamber to any desired location.

During normal running of the engine, the velocity of the gas flow in the exhaust duct is high and the provision of an efficient diffusing channel downstream of the inlet gap enables the recovery of substantial pressure energy. Further since the inlet gap constitutes a high velocity intake the amount by which the edge of the said portion of the exhaust duct defining wall is spaced from the part of the exhaust duct wall immediately upstream thereof, need not be large, whereby undesirable losses in the exhaust duct are avoided.

Normally, selective means will be provided for controlling the abstraction of the hot gas from the exhaust stream. For instance a manually or power-operated valve device may be provided for this purpose in the distribution ducting connected with the chamber outlet.

The arrangement of the invention operates most satisfactorily when used with an exhaust duct of substantially circular or other closed section, and the inlet gap extends wholly around the boundary surface of the duct and communicates with a chamber of annular or equivalent form in the wall of the exhaust duct. In this manner the abstraction of hot gas from the exhaust stream is uniform, and major local disturbances in the exhaust flow are avoided.

There will now be described one turbine exhaust arrangement including means for abstracting exhaust gases from the exhaust gas stream, which exhaust arrangement is suitable for use with a known construction of gas-turbine engine. The description refers to the accompanying drawings in which:

Figure 1 is a partial axial section (on the line I—I of Figure 2) through the gas-turbine engine exhaust assembly, and Figure 2 is a partial section on the line 2—2 of Figure 1.

Referring to the drawings, the exhaust assembly is of the kind comprising an outer exhaust duct defining wall of substantially cylindrical or frusto-conical form within which is supported a conical fairing, the outer wall and conical fairing defining between them an annular exhaust passage.

In the drawings there is indicated a flanged end ring 10 by which the exhaust assembly will be bolted to the turbine casing (not shown) with the annular exhaust passage 11 registering with the outlet annulus of the turbine.

The outer wall of the exhaust passage 11 is formed immediately downstream of the end ring 10 by a sheet metal double-skinned structure 12. Immediately downstream of the structure 12, the exhaust passage wall is formed by a substantially cylindrical or frusto-conical sheet metal wall 13, and downstream of the wall 13 there is a second end ring 14 to which a jet-pipe (not shown) can be attached.

The wall 13 and the conical fairing 15 are supported within a continuation 12a of the double-skinned wall structure 12 by means of a number of struts 16 which extend through the wall structure 12a, the wall 13 and the conical fairing 15 to support the latter centrally within the outer wall of the exhaust assembly. Where the struts 16 cross the exhaust passage 11 they are enclosed in aerofoil section fairings 17 in a well-known manner.

The upstream edge 13a of the sheet metal wall 13 is spaced from the double-skinned outer wall structure 12, 12a so that an annular gap 13b is left between the leading edge 13a and the double-skinned outer wall structure 12, 12a constituting an inlet which faces upstream of the exhaust gas flow in the exhaust passage 11, to a collector chamber 18 formed between the main wall structure 12a and the wall 13 which separates the chamber 18 and the exhaust passage. The portion of the wall structure 12a immediately downstream of the portion 12 diverges from the sheet metal wall 13 so that the annular collector chamber 18 for the abstracted hot gas is formed which has a gradually increasing cross-sectional area.

The downstream end of the continuation 12a of the double-skinned wall structure carries an end ring 14 which comprises a cylindrical extension 14a co-operating with a spherical-surfaced ring 19 secured on the downstream end of the wall 13 to provide a gas seal between the chamber 18 and the exhaust passage 11 while at the same time permitting relative expansion between the wall 13 and the continuation 12a of the double-skinned wall 12.

The leading edge 13a of the wall 13 may be located with respect to the double-skinned wall structure 12, 12a by means of radial locating pins 33.

Outlets are provided from the chamber 18 and one of its outlets is shown in Figure 2 as comprising a neck structure 20 extending through the downstream end of the continuation 12a of the double-skinned wall, a control valve chamber 21 bolted to the neck and an elbow pipe 22 connected to the outlet end of the valve chamber 21.

The valve chamber 21 accommodates a butterfly valve 23 carried on a spindle 24 having an operating arm 25 connected with power operating means for the valve, which means is illustrated as a hydraulic ram 26. The hydraulic ram is supported on a bracket 27 bolted to the end ring 14.

In order to ensure that the butterfly valve 23 is fully closed at the end of the ram stroke, a spring abutment is provided for the end of the ram opposite that connected to the operating arm 25, the arrangement being such that the spring abutment is compressed during the final closing of the ram 26.

As will be seen from Figure 2, one end of the ram is connected with a rocking arm in the form of a triangular plate 28 to which is also pivotally connected a bolt member 29 providing at its outer end one abutment 30 for a compression spring 31, the other abutment 32 for which is secured to the bracket 27. With this arrangement the ram 26 forms a tension link between the valve operating lever 25 and the rocking lever 28, the pivotal movement of which is restrained by the compression spring 31 so that, when the butterfly valve 23 is fully closed, additional travel of the ram compresses the spring 31 resiliently loading the butterfly valve 23 into the closed position.

In use of the exhaust arrangement of this invention, when the butterfly valve 23 is opened and the gas-turbine engine with which the exhaust assembly is associated is operating, high velocity gases will enter the chamber 18 through the upstream facing gap 13b and will be diffused in flowing through the diverging portion of the chamber 18 so as to convert some of the kinetic energy of the gases into pressure head. The angle of divergence of the diverging portion of the chamber 18 will vary according to the required mass flow of hot gas through the chamber. This will normally be selected to give as high a static pressure as is possible at the outlet from the chamber 18. A divergence of the order of 8° will generally be found to be satisfactory although this value may vary in dependence upon the various design considerations.

The high pressure gases within the chamber 18 may be delivered through the outlet means such as that illustrated to any convenient location in an aircraft for example. For example the elbow 22 may lead to the air intake of the engine with which the exhaust assembly is associated where the hot gas may be distributed uniformly over the inlet. In addition to providing a source of hot gas for introduction into the air entering the compressor intake, the abstracted hot gas may be used locally for heating the engine nacelle or other aircraft parts.

I claim:

1. A gas turbine exhaust arrangement having means for extracting exhaust gas from the exhaust stream comprising in combination an exhaust duct defining wall having a first wall portion and a second wall portion located downstream of the first wall portion which second wall portion closely follows the desired form of the duct and has its upstream edge spaced into the exhaust duct away from the said first wall portion of the duct defining wall so as to constitute a high velocity gas entry gap which faces upstream of the duct; a collector chamber structure having an inlet formed by said gap and an outlet, and a cross-sectional area which increases gradually from its inlet to its outlet whereby diffusion of the exhaust gas occurs to convert velocity energy to pressure energy; and distribution ducting connecting the outlet of said chamber to any desired location.

2. A turbine exhaust arrangement as claimed in claim 1, wherein said gap is substantially continuous and of a shape conforming with that of the closed cross-section of said exhaust duct defining wall.

3. A turbine exhaust arrangement as claimed in claim 1, wherein the said second wall portion of the exhaust duct defining wall forms also a wall of said collector chamber and separates said collector chamber from said exhaust duct.

4. A turbine exhaust arrangement as claimed in claim 1, wherein the said second wall portion is in the form of a sleeve and is within an outer main wall structure with its downstream edge having gas sealing engagement with said outer main wall structure.

5. A turbine exhaust arrangement as claimed in claim 4, wherein the downstream edge of said sleeve is provided as a spherical surfaced ring co-operating with a cylindrical surface on the outer main wall structure thereby to provide a seal between the downstream edge of said sleeve and the outer main wall structure and to permit relative expansion between the sleeve and the outer main wall structure.

6. A gas-turbine exhaust arrangement comprising an annular wall affording an exhaust gas passage therethrough which annular wall has a first annular part and a second annular part located downstream of said first annular part to form a substantially smooth continuation of the first annular part, said second annular part having its upstream edge spaced radially from the surface of the first annular part into the exhaust gas flow to form a narrow annular gap facing upstream to the exhaust gas flow, and a structure located out of the exhaust gas passage and formed as an axial extension of said first annular part, which extension extends along the length of and diverges from said second annular part to form therewith a diffuser chamber having an inlet thereto provided by said narrow annular gap and having a cross-sectional area which increases in a direction away from said inlet, there being outlets from the diffuser chamber at the end thereof remote from the inlet.

7. A gas-turbine exhaust arrangement comprising an annular exhaust gas passage defining wall which wall has a first annular part and a second annular part located axially downstream of said first annular part to form a substantially smooth continuation of the first annular part, said second annular part having its axially upstream edge spaced radially inwards from the surface of the first annular part into the exhaust gas flow to form a narrow gap facing axially upstream to the exhaust gas flow, and a structure located out of the exhaust gas passage and formed as an axial extension of said first annular part, which extension extends along the length of and diverges from said second part to form therewith a diffuser chamber having an inlet thereto provided by said narrow gap and having a cross-sectional area which increases in a direction way from said inlet, there being outlets from the diffuser chamber at the end thereof remote from the inlet.

RALPH JANES.

REFERENCES CITED

The following references are of record in the file of this patent:

UNITED STATES PATENTS

| Number | Name | Date |
| --- | --- | --- |
| 2,198,730 | Kadenacy | Apr. 30, 1940 |
| 2,272,676 | Leduc | Feb. 10, 1942 |
| 2,404,275 | Clark | July 16, 1946 |
| 2,418,488 | Thompson | Apr. 8, 1947 |
| 2,474,068 | Sammons | June 21, 1949 |